United States Patent
DeLuca

(10) Patent No.: US 9,143,599 B2
(45) Date of Patent: Sep. 22, 2015

(54) COMMUNICATION SYSTEM PROVIDING DATA TRANSFER DIRECTION DETERMINATION BASED UPON MOTION AND RELATED METHODS

(75) Inventor: Michael Joseph DeLuca, Boca Raton, FL (US)

(73) Assignee: BlackBerry Limited, Waterloo, ON (CA)

( * ) Notice: Subject to any disclaimer, the term of this patent is extended or adjusted under 35 U.S.C. 154(b) by 538 days.

(21) Appl. No.: 12/955,066

(22) Filed: Nov. 29, 2010

(65) Prior Publication Data

US 2012/0135680 A1 May 31, 2012

(51) Int. Cl.
*H04B 7/00* (2006.01)
*H04M 1/725* (2006.01)
*H04M 1/2745* (2006.01)
*H04B 5/00* (2006.01)
*H04B 17/27* (2015.01)

(52) U.S. Cl.
CPC ...... *H04M 1/7253* (2013.01); *H04M 1/274516* (2013.01); *H04B 5/0031* (2013.01); *H04B 17/27* (2015.01); *H04M 2250/04* (2013.01)

(58) Field of Classification Search
CPC .. H04B 5/0031; H04B 5/0012; H04M 1/7253
USPC ..................... 455/41.1, 41.2, 41.3
See application file for complete search history.

(56) References Cited

U.S. PATENT DOCUMENTS

| | | | |
|---|---|---|---|
| 7,702,282 B2 | 4/2010 | Sandegard et al. | 455/41.2 |
| 8,295,769 B2 * | 10/2012 | Bloebaum | 455/41.3 |
| 8,391,786 B2 * | 3/2013 | Hodges et al. | 455/41.2 |
| 2007/0188323 A1 | 8/2007 | Sinclair et al. | 340/568.1 |
| 2008/0195735 A1 * | 8/2008 | Hodges et al. | 709/227 |
| 2010/0081375 A1 * | 4/2010 | Rosenblatt et al. | 455/41.1 |
| 2011/0037712 A1 * | 2/2011 | Kim et al. | 345/173 |
| 2011/0081923 A1 * | 4/2011 | Forutanpour et al. | 455/457 |
| 2011/0126014 A1 * | 5/2011 | Camp et al. | 713/171 |

OTHER PUBLICATIONS

U.S. Appl. No. 13/034,006, filed Feb. 24, 2011, Moosavi et al.
U.S. Appl. No. 12/955,066, filed Nov. 29, 2010, DeLuca.
Bailly et al. "*White Paper: Breakthroughs in the European Mobile Payment Market*" Atos Origin.
Kirovski et al. "*The Martini Synch: Using Accelerometers for Device Pairing*" Microsoft Research.
Jefferson et al. "*The Human Chain puts NFC form factors to the test in latest White Paper*" Aug. 28, 2009.

(Continued)

*Primary Examiner* — Ping Hsieh
(74) *Attorney, Agent, or Firm* — Guntin & Gust, PLC; Ed Guntin

(57) ABSTRACT

A communication system may include at least one electronic device configured to wirelessly communicate via a short-range communications format, and at least one mobile communications device. The at least one mobile communications device may include a short-range communications device configured to wirelessly communicate with the at least one electronic device via the short-range communications format, and a controller coupled to the short-range communications device. The controller may be configured to determine a state of movement of the at least mobile communications device, and determine a direction of communication with respect to the at least one electronic device based upon the determined state of movement.

22 Claims, 10 Drawing Sheets

(56) References Cited

OTHER PUBLICATIONS

"*Apple Getting Serious About Near Field Communication on the iPhone*" http://www.patentlyapple.com Feb. 18, 2010: Printed Oct. 5, 2010.

"Flip n Shake light" http://uk.androlib.com/android.application.com-zosqlabs-androidflipshake-wBBB.aspx printed Feb. 22, 2010.

Rukzio et al. Exploring Expressive NFC-Based Mobile Phone Interaction with Large Dynamic Displays Near Field Communication, 2009. NFC '09. First International Workshop: Feb. 24, 2009 pp. 36-41 Abstract: Inherent obstacles (Abstract only).

Thoughts on Nokia's NFC developments by Timo | Published: May 7, 2008 Printed Feb. 22, 2011 http://www.nearfield.org/2008/05/thoughts-on-nokias-nfc-developments.

Nokia 6131 NFC User Guide http://nds1.nokia.com/phones/files/guides/Nokia_6131_NFC_UG_en.pdf.

Tiro Arnall Graphic language for touch Nov. 21, 2005 http://www.elasticspace.com/2005/11/graphic-language-for-touch.

"Towards a Secure Internet of Things made of RFID/NFC" http://www.comics.unina.it/index.php?option=com_content&task=view&id=226&Itemid=1: Printed Jan. 28, 2011.

"Fonelabs launches range of low-cost NFC phones" http://www.nearfieldcommunicationsworld.com/2009/03/12/3856/fonelabs-launches-range-of-low-cost-nfcphones; Printed Jan. 28, 2011.

Bump Iphone Application: http://iphone.tmcnet.com/topics/iphone/articles/55072-bump-app-exchanging-contact-info-the-iphone-one.htm Nov. 23, 2010.

Mover Iphone App: http://infinite-labs.net/mover/ Nov. 23, 2010.

Pering et al. "*Gesture Connect: Facilitating Tangible Interaction with a Flick of the Wrist*", 2007.

* cited by examiner

COMMUNICATION SYSTEM PROVIDING DATA TRANSFER DIRECTION DETERMINATION BASED UPON MOTION AND RELATED METHODS

TECHNICAL FIELD

This application relates generally to the field of communications, and more particularly, to electronic devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
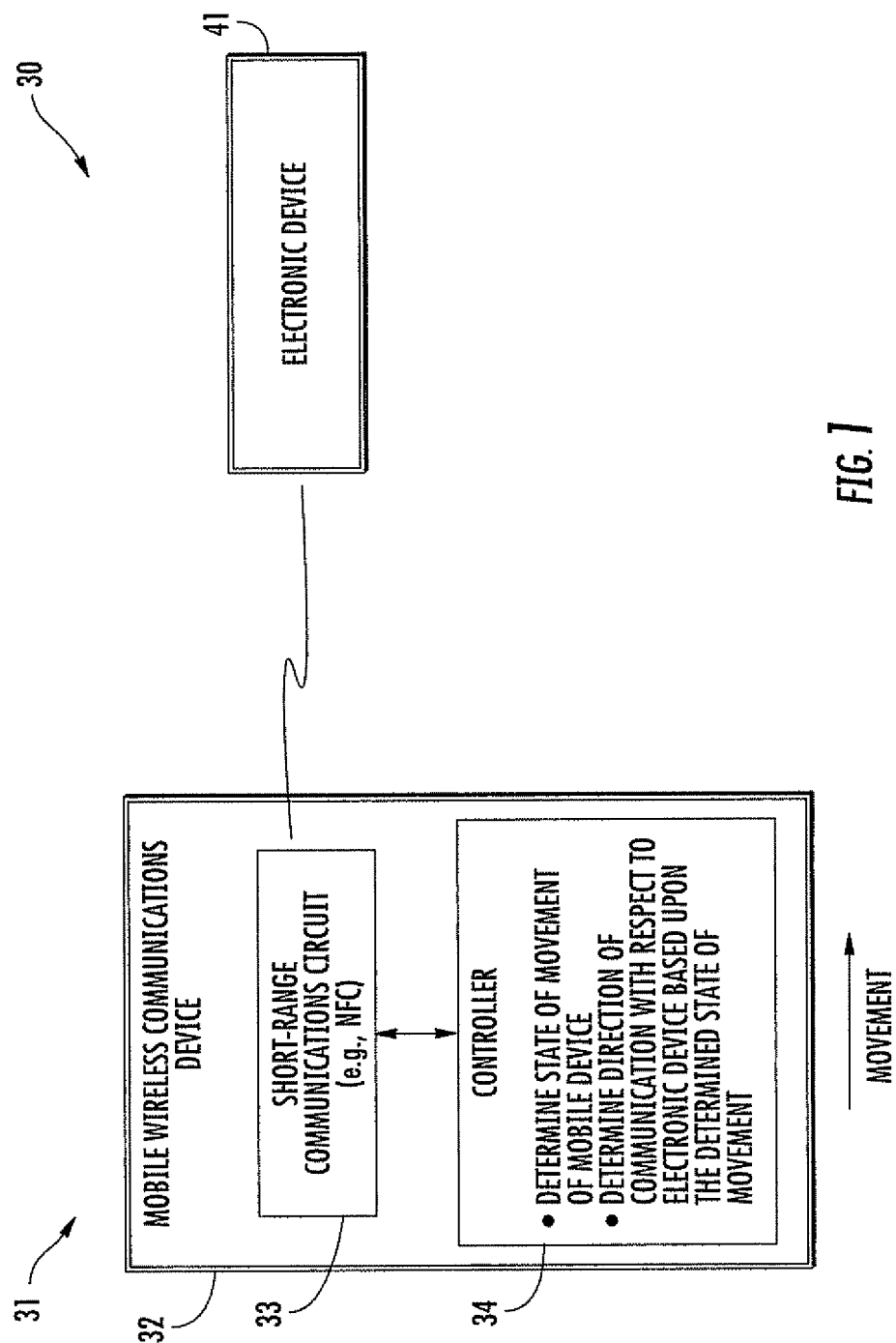
FIG. 1 is a schematic block diagram of a communication system in accordance with one example aspect.
Figure 2:
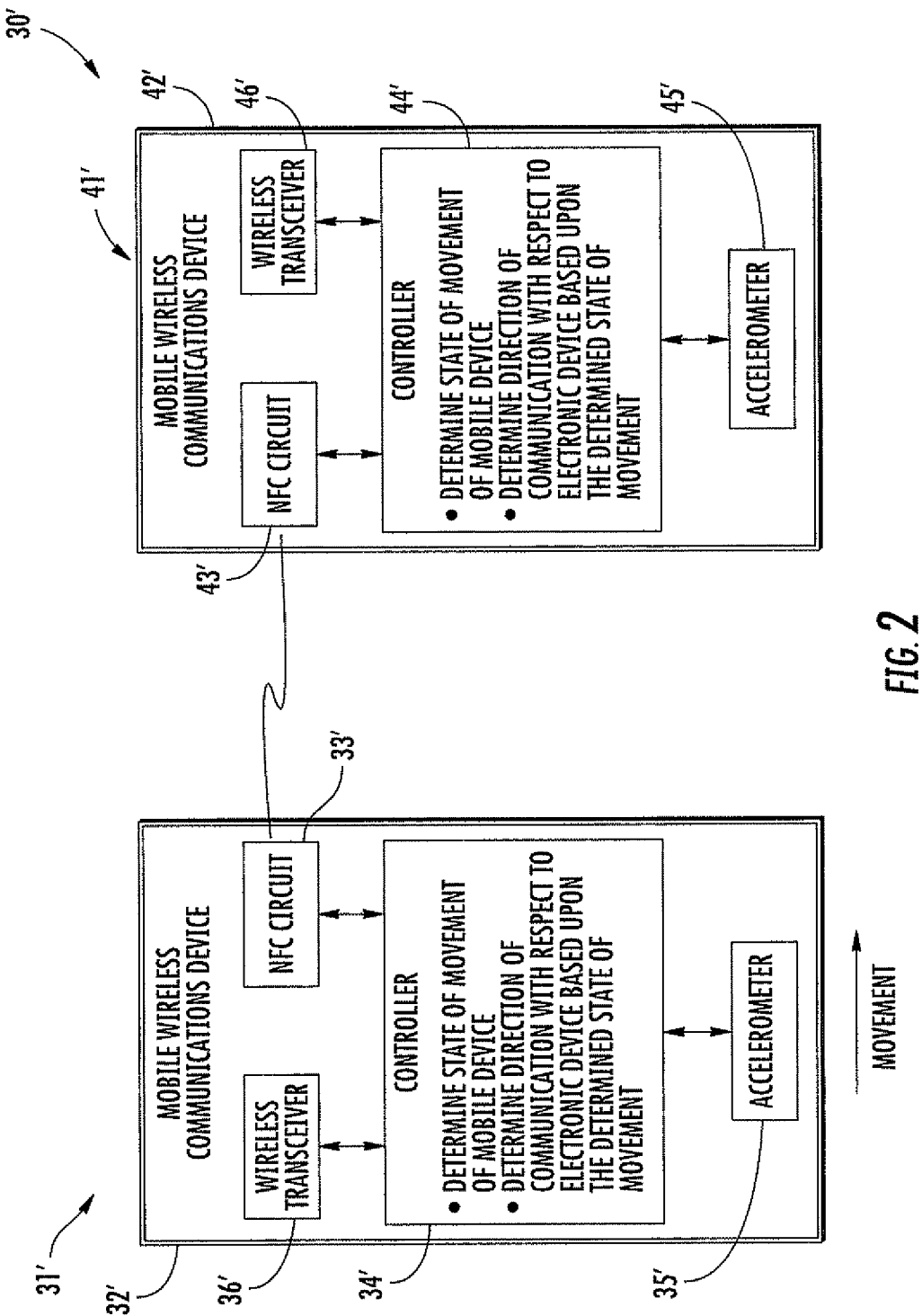
FIG. 2 is schematic block diagram of an alternative embodiment of the system of FIG. 1.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a communication system is disclosed herein which may include at least one electronic device configured to wirelessly communicate via a short-range communications format, and at least one mobile communications device. The at least one mobile communications device may include a short-range communications device configured to wirelessly communicate with the at least one electronic device via the short-range communications format, and a controller coupled to the short-range communications device. The controller may be configured to determine a state of movement of the at least one mobile communications device, and determine a direction of communication with respect to the at least one electronic device based upon the determined state of movement. As such, movement (or lack thereof) of the mobile communications device may advantageously be used to determine whether transmitting data (e.g., digital content data) to, receiving data from, or exchanging data with, the electronic device is appropriate.

More particularly, the at least one mobile communications device may further include an accelerometer coupled to the controller, and the controller may be further configured to determine the state of movement of the at least one mobile communications device based upon the accelerometer. The controller may also be configured to transmit digital content data to the at least one electronic device based upon determined movement of the at least one mobile communications device, and to receive digital content data from the at least one electronic device based upon no movement of the at least one mobile communications device.

In addition, the at least one mobile communications device may further include a portable housing carrying the short-range communications circuit and the controller, and the controller may be further configured to determine an impact to the portable housing and determine the direction of communication with respect to the at least one electronic device also based upon the determined impact to the portable housing. The controller may also be configured to determine a magnitude of movement of the at least one mobile communications device, and determine the direction of communication with respect to the at least one electronic device also based upon the determined magnitude of movement.

The at least one electronic device may be further configured to determine movement thereof, and the at least one electronic device and the controller may be configured to exchange digital content data therebetween based upon respective determined movement. By way of example, the short-range communications device may comprise a Near-Field Communication (NFC) device. Moreover, the mobile communications device may further include a wireless transceiver carried by the portable housing and configured to communicate via a wireless communications network.

A related mobile communications device, such as the one described briefly above, and a related communication method are also provided. The method may include determining a state of movement of the at least mobile communications device, and determining a direction of communication with respect to the at least one electronic device based upon the determined state of movement.

A non-transitory computer-readable medium for a mobile communications device, such as the one described briefly above, is also provided. The non-transitory computer-readable medium may have computer executable instructions for causing the mobile communications device to perform steps comprising determining a state of movement of the mobile communications device, and determining a direction of communication with respect to the at least one electronic device based upon the determined state of movement.

By way of background, mobile communications devices (also referred to as "mobile devices" herein), such as portable cellular telephones, etc. are being equipped with short-range communications capabilities (e.g., NFC) to enable near field communication of information or data between mobile devices as well as other electronic devices (e.g., NFC tags, etc.). Data such as digital content data (e.g., electronic files, etc.) stored in the memory of one mobile device may be transmitted to another mobile device (or other electronic device, etc.) via NFC communications, or such data may be exchanged between the devices.

Figure 5:
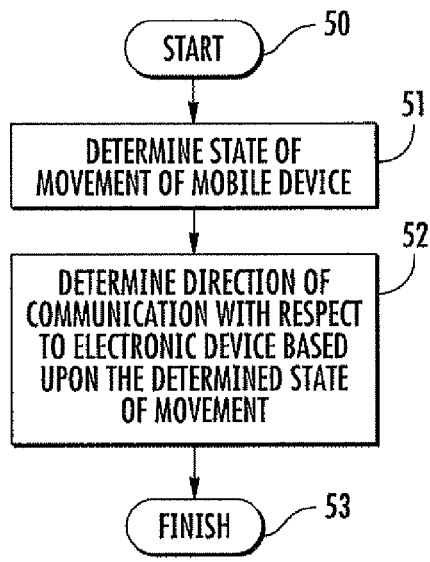
FIGS. 5 and 6 are flow diagrams illustrating method aspects associated with the systems of FIGS. 1 and 2.
Figure 6:
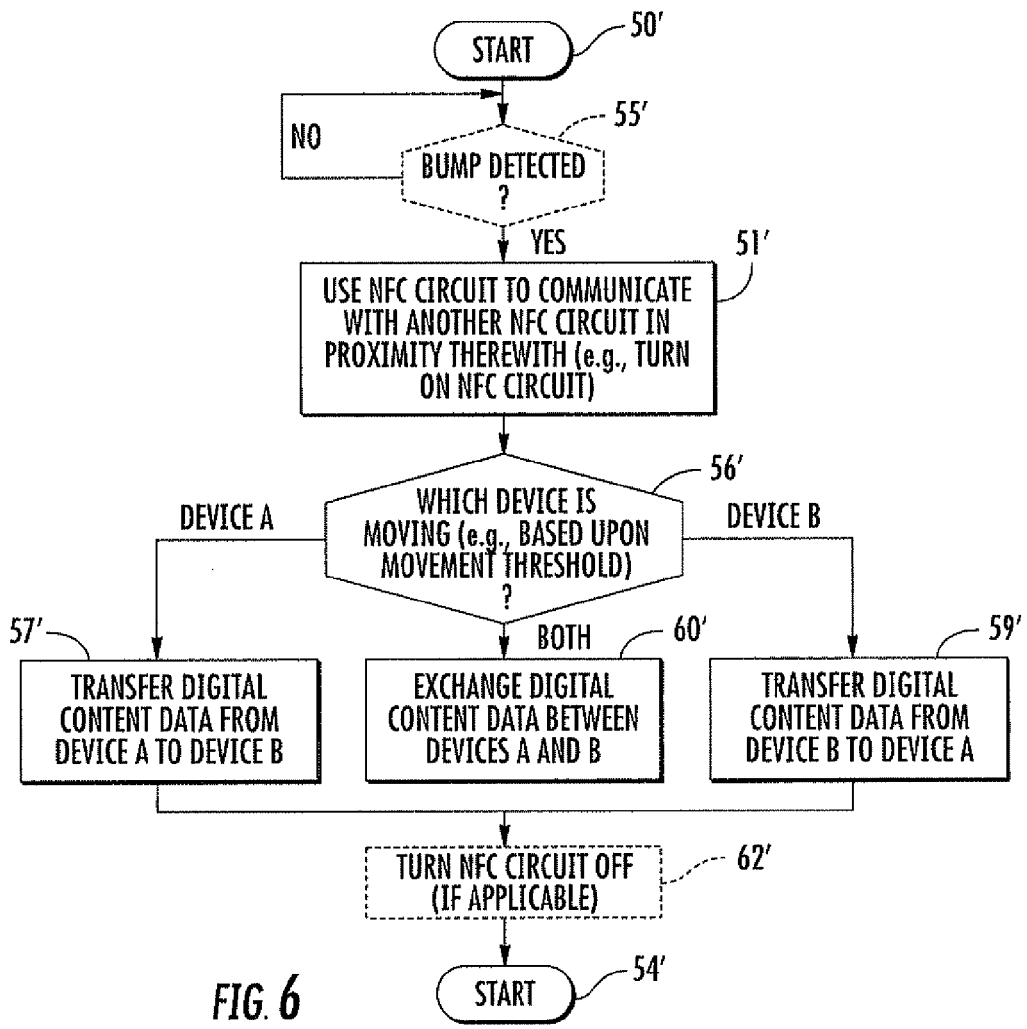

Referring initially to FIGS. 1 and 5, a communication system 30 illustratively includes an electronic device 41 which is configured to communicate via a short-range communications format (e.g., NFC). The system 30 further illustratively includes a mobile device 31 which includes a portable housing 32, a short-range communication circuit 33 (e.g., an NFC circuit) carried by the portable housing and configured to communicate via the short-range communications format, and a controller 34 carried by the portable housing and coupled to the short-range communications circuit.

NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

By way of example, various mobile devices that may be used for the embodiments described herein include portable or personal media players (e.g., MP3 players, video players, etc.), remote controls (e.g., television or stereo remotes, etc.), portable gaming devices, portable or mobile telephones, smartphones, tablet computers, etc. Furthermore, the controller 34 may be implemented using a combination of hardware (e.g., microprocessor, etc.) and non-transitory computer-readable medium components having computer-executable instructions for performing the various operations described herein. Moreover, the electronic device 41 may also be a mobile device, although it may be stationary or otherwise intended not to be readily portable, such as a television, stereo, desktop computer, etc. In some embodiments, the electronic device may comprise an NFC tag (e.g., a poster tag, etc.), for example.

Beginning at Block 50, the controller 34 may be configured to communicate with the electronic device 41 via the short-range communications (e.g., NFC) circuit 33 when in proximity therewith. The controller 34 is further configured to determine a state of movement of the mobile device 31, at Block 51, and to determine a direction of communication with respect to the electronic device 41 based upon the determined state of movement, at Block 52, which concludes the method illustrated in FIG. 5 (Block 53). As such, it may advantageously be determined if the mobile device 31 is attempting to transmit data (e.g., digital content data) to the electronic device 41, receive data therefrom, or both (i.e., to exchange data therewith). In other words, by "direction of communication" it is meant which way digital content data is "flowing", i.e., from the mobile device 31 to the electronic device 41, from the electronic device 41 to the mobile device 31, or both. By way of example, the digital content data may include contacts (e.g., digital business cards), audio, video, images, addresses or appointments, documents, applications, financial information, security information, etc.

In the present example, the mobile device 31 is moving toward the electronic device 41 which is stationary. As such, the controller 34 determines that it should be transmitting data to the electronic device 41 due to the movement of the mobile device 31. On the other hand, if the controller 34 determines that the mobile device is not moving prior to the portable housing 32 being bumped with the electronic device 41 or at the point where NFC communication otherwise commences due to close proximity, then the controller 34 determines that it is to receive digital content data from the electronic device 41. However, it should be noted that this order may be reversed in some embodiments (i.e., movement signifies data is to be received, and no movement signifies that digital content data is to be transmitted). In some example embodiments, movement of the mobile device 31 toward the electronic device 41 signifies that data is to be transmitted by the mobile device 31, and movement of the mobile device 31 away from the electronic device 41 signifies that data is to be received by the mobile device 31.

Pre-selection of data qualified to transmit via NFC communications may be a precondition of data exchange in some embodiments. For example, a business card (e.g., a personal address book contact) for the mobile device 31 owner may be pre-selected as enabled for communication via NFC, while the remainder of the address book would not be pre-selected or designated for communication. In this way, the business card may be a "default" file that is automatically transferred to a different mobile device upon movement of a given mobile device to initiate NFC communications.

Referring additionally to FIGS. 2-4 and 6, in this example the electronic device 41' is also a mobile device similar to the mobile device 31'. Here both of the mobile devices 31', 41' have NFC short-range communication circuits 33', 43' and further include an accelerometer 35', 45' carried by their portable housings 32', 42' and coupled to their controllers 34', 44', respectively. As such, the controllers 34', 44' may advantageously use the accelerometers 35', 45' to determine the respective states of movement of the mobile devices 31', 41'.

Figure 3:
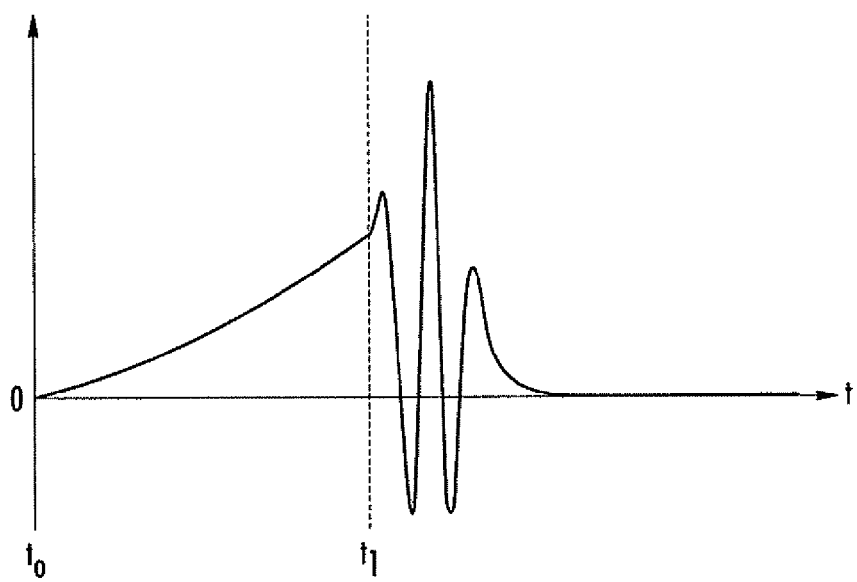
FIGS. 3 and 4 are acceleration vs. time graphs for the mobile wireless communications devices of FIG. 2.
Figure 4:
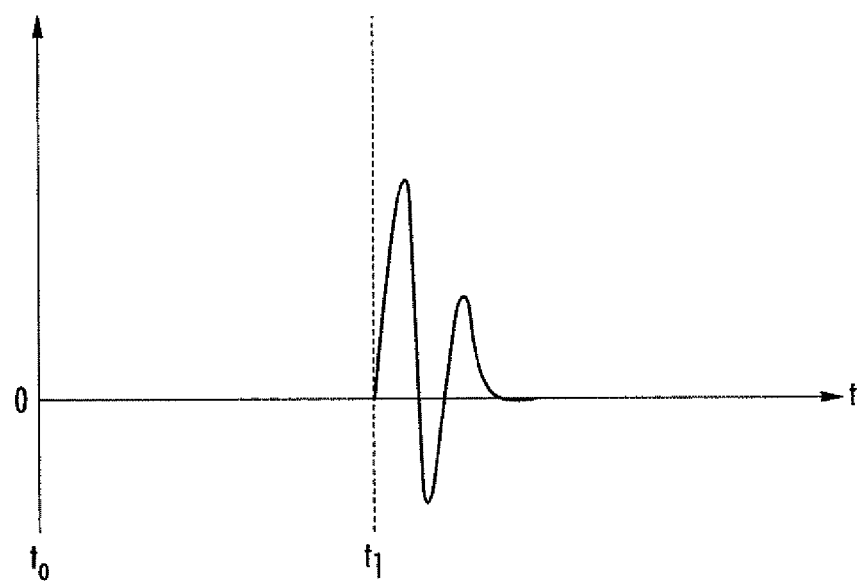

Acceleration graphs of the mobile devices 31', 41' are shown in FIGS. 3 and 4, respectively. It should be noted that the example acceleration graphs provided herein are schematic in nature and provided for reference purposes, but are not graphs of actual accelerometer measurement data. In the present example, the mobile device 31' is moved or accelerated beginning at time $t_0$ until it collides with or bumps the mobile device 41' at time $t_1$. That is, the bump is physical contact between the portable housings 32', 42'. As such, the acceleration curve for the mobile device 31' ramps up between times $t_0$ and $t_1$, while the acceleration curve for the mobile device 41' between these times is relatively horizontal or flat. A threshold may be used to determine whether movement has occurred, such as whether the slope of the acceleration curve exceeds a threshold level. Thus, little or slight movement may be considered as not moving, for example.

It should be noted that in some embodiments movement of a mobile device may be determined or detected by a component other than an accelerometer. For example, this may be done based upon movement detected from an optical sensor (e.g., a charge-coupled device (CCD)), gyroscope, compass, etc.

Upon detection of the bump, at Block 55', the NFC circuits 33', 43' may begin communicating (e.g., they may be turned on or otherwise enabled for communication), at Block 51', and the controllers 34', 44' may advantageously determine whether their respective mobile devices 31', 41' were moving prior to or at the time of the bump based upon the ramp or slope of the acceleration curve, at Block 56'. In the case where the NFC circuits 33', 43' are powered on or awakened from a sleep mode by the physical contact of the mobile devices 31', 41', then these circuits may optionally be turned off or returned to a power-saving or sleep mode once NFC communications are complete, at Block 62'.

It should be noted, however, that a bump or physical contact of the mobile devices 31', 41' is not required in all embodiments. That is, the mobile devices 31', 41' need not actually physically contact in all embodiments for NFC (or other short-range) communications to take place. As such, the triggering event for when to check for movement may be when NFC communications are first initiated (i.e., the NFC circuits 33', 43' first come in range and begin communicating with one another), for example. For instance, one or both of the NFC circuits 33', 43' may be operating in an active NFC mode and powered on prior to coming in proximity with each other, which will result in the detection of one another and commencement of NFC communication.

In the case where the mobile device 31' was in motion prior to the bump but the mobile device 41' was not, the controller 34' conveys its digital content data to the controller 44' via the NFC circuit 33', 43', at Blocks 56', 57'. In the opposite case, i.e., where the mobile device 31' was not in motion prior to the bump but the mobile device 41' was in motion, then the controller 44' conveys its digital content data to the controller 34' via the NFC circuits 33', 43', at Block 59'.

Figure 7:
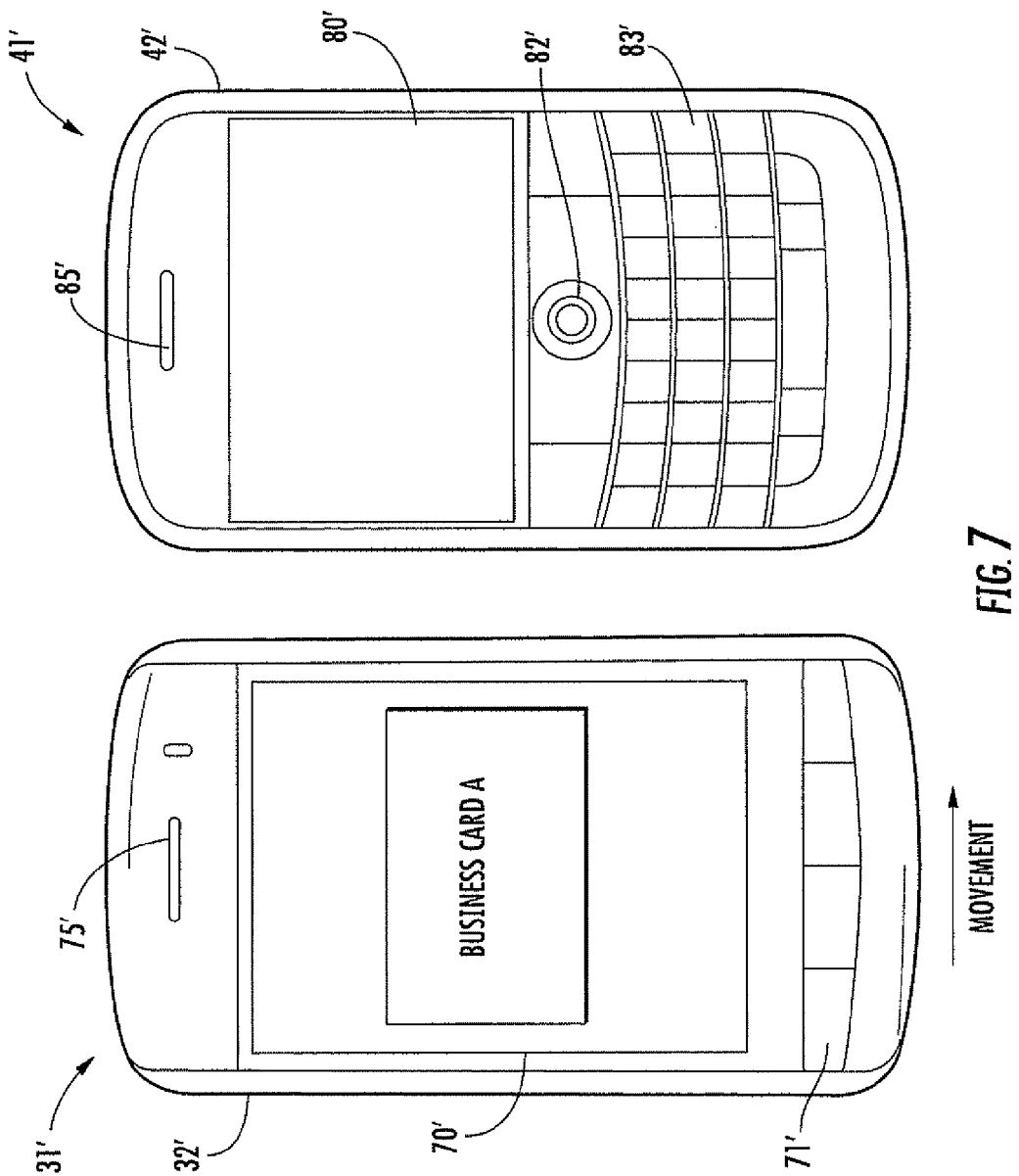
FIGS. 7 through 10 are front views of example mobile wireless communications devices of the system of FIG. 2 illustrating various use cases.
Figure 8:
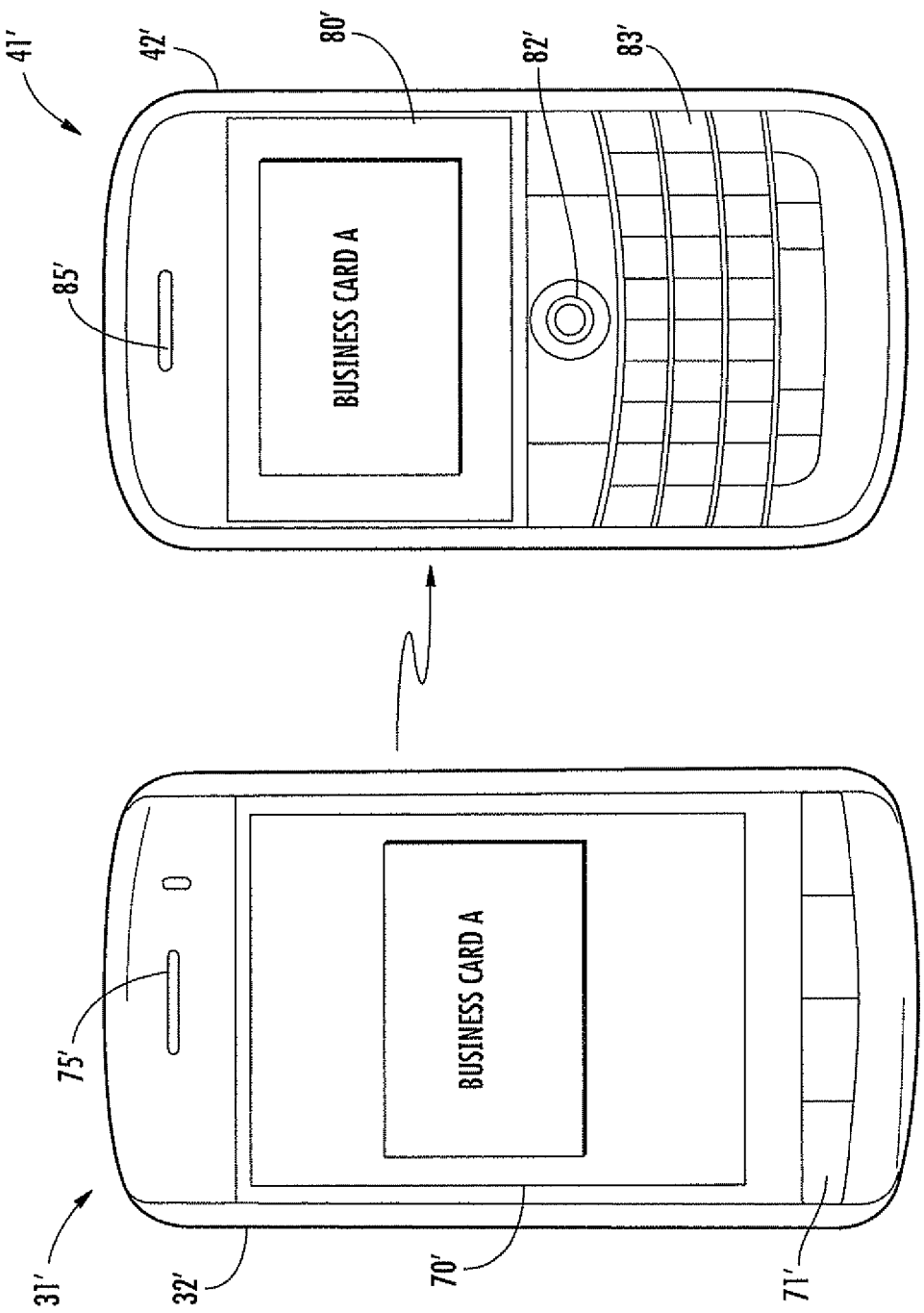

By way of example, in FIG. 7 the mobile device 31' is shown moving toward a mobile device 41'. In this example embodiment, the mobile device 31' further includes a touch screen display 70', input buttons 71', and an audio output transducer 75', all of which are carried by the housing 32' and coupled to the controller 34'. Moreover, the mobile device 41' illustratively includes a display 80', a track ball 82' and a keypad 83' (which serve as input devices), and an audio output transducer 85', all of which are carried by the housing 42' and coupled to the controller 44'. In the example of FIG. 7, the mobile device 31' is initially displaying a contact "business card" ("Business Card A") on the display 70' prior to contact with the stationary mobile device 41'. That is, displaying a digital content item (e.g., contact, image, etc.) on the display may designate that item for transfer upon movement of the mobile device 31' into contact with the mobile device 41', although in other embodiments content may be pre-selected for transfer via other approaches, as discussed above. Once the bump occurs, the controller 34' transmits the business card to the controller 44', as seen in FIG. 8. This transfer may be accomplished by the NFC circuits 33', 43', or in some embodiments the transfer may be performed via a separate communications path, such as via the wireless transceivers 36', 46' (e.g., Bluetooth, etc.).

Figure 9:
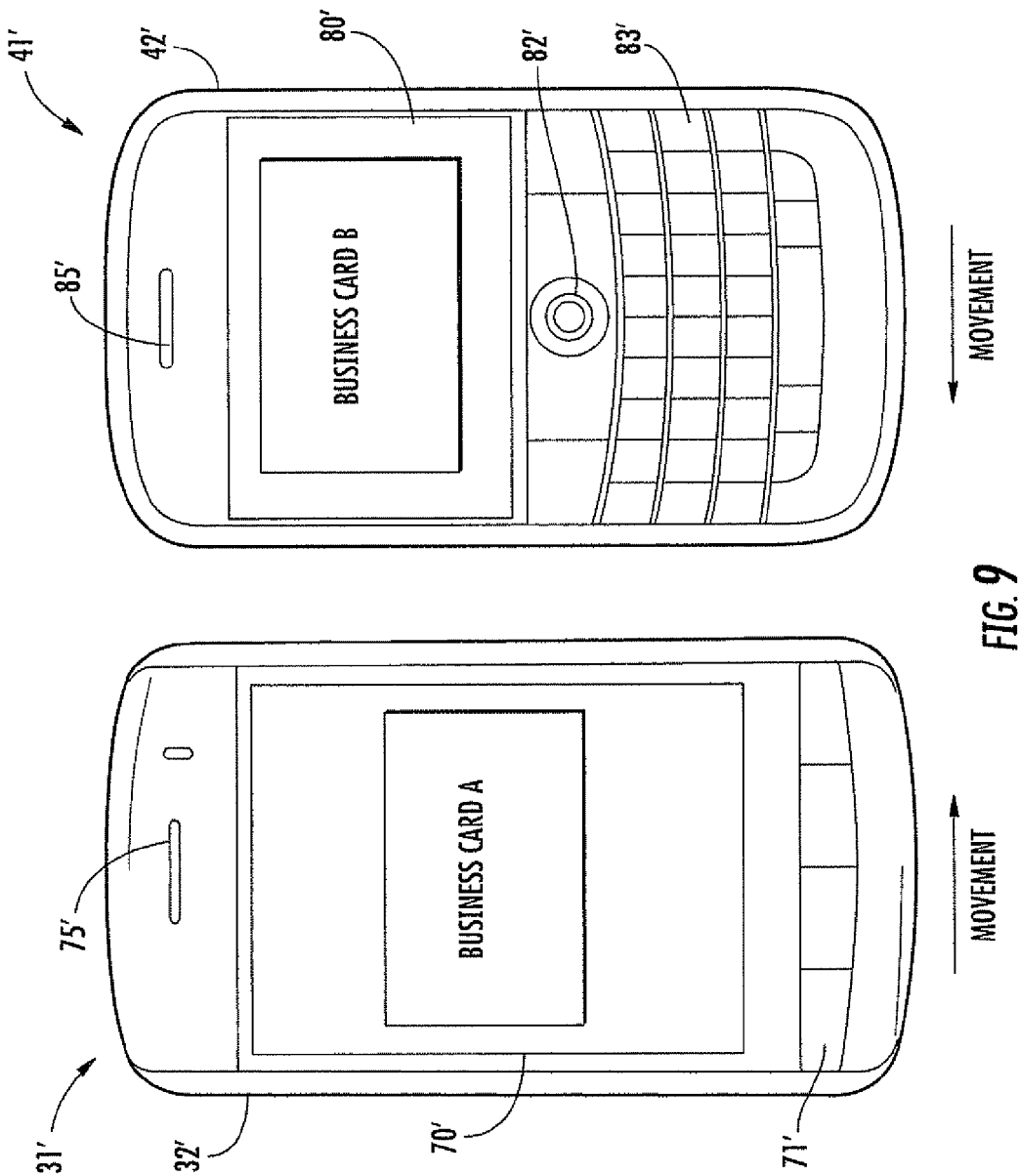
Figure 10:
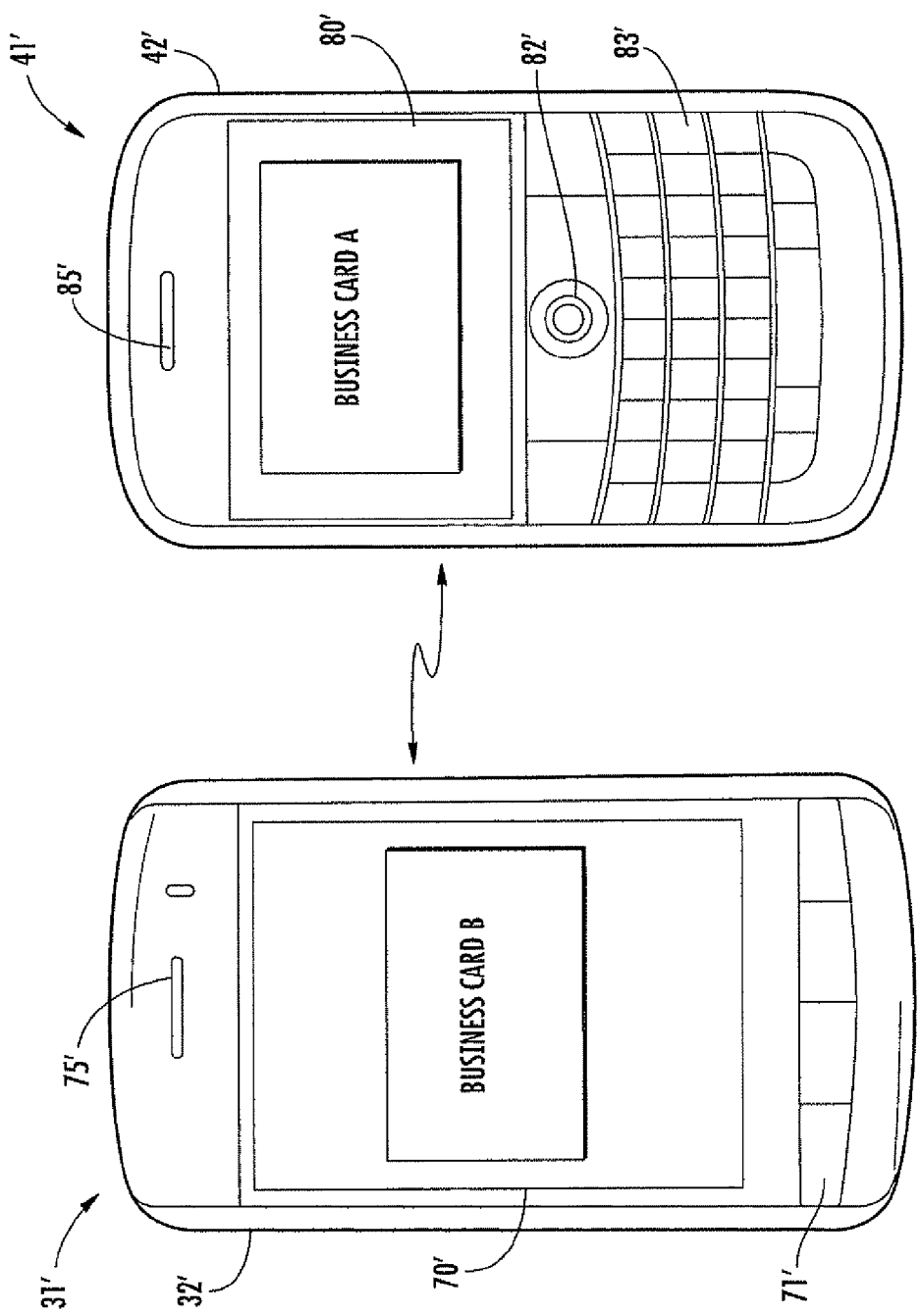

In the case where both mobile devices 31', 41' were in motion just prior to the bump (i.e., they bumped each other), then the controllers 33', 43' exchange respective digital content data, at Block 60'. An example implementation of this case is shown in FIGS. 9 and 10. As seen in FIG. 9, each of the mobile devices 31', 41' is displaying a business card ("Business Card A", "Business Card B") on its respective display 70', 80' and are moving toward one another. After the bump occurs, the digital business cards are exchanged between the mobile devices 31', 41', as seen in FIG. 10.

In the examples of FIGS. 7-10, both of the mobile devices 31', 41' have motion detection capabilities (i.e., the accelerometers 35', 45'). However, referring again to FIG. 1, in some embodiments the electronic device 41 may be stationary or not have motion detection capabilities. For example, the electronic device 41 may be a personal computer, etc., with NFC capabilities (e.g., an NFC peripheral) but no motion detection capabilities. Yet, it may still be desirable to utilize the motion of the mobile device 31 to not only transmit digital content data to the electronic device 41, but also to receive digital content data therefrom (or exchange digital content data therewith). These different operations may be invoked by using a given series of movements or bumps to signify a respective data transfer operation.

Figure 11:
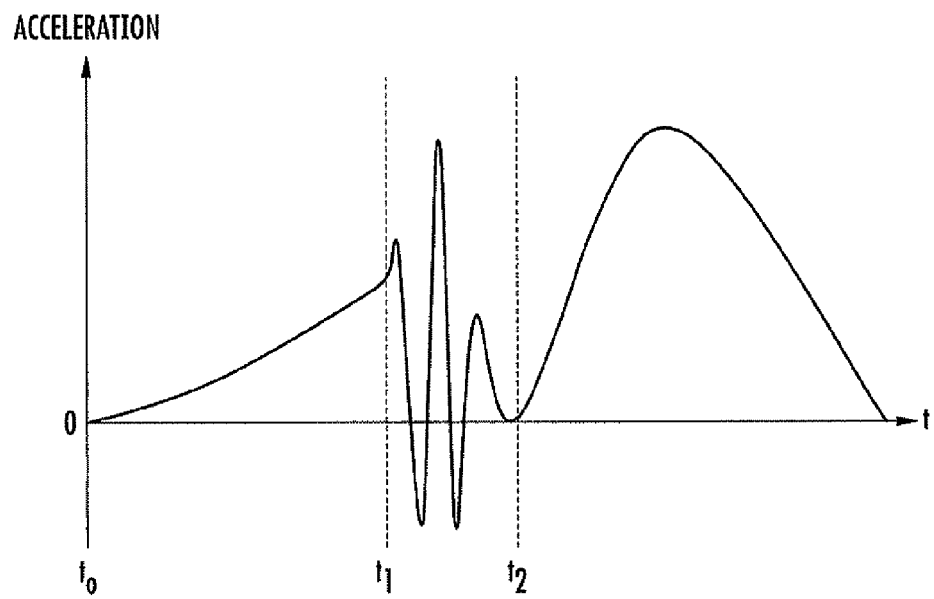
FIGS. 11 and 12 are acceleration versus time graphs for the system of FIG. 1 illustrating various use cases when the electronic device is stationary or without motion sensing capabilities.

For example, movement followed by a bump and then a stop (no movement or acceleration), i.e., a "bump-stop" sequence, as shown in FIG. 3, may be used to indicate that digital content is to be transferred to the electronic device 41. Note that when implementing the "bump-stop" mode, the motion detection for device 31 may be determined by detection of a sound associated with a bump resulting from the motion, by monitoring a microphone or other transducer coupled to device 31, thereby eliminating the necessity of accelerometer determined motion. To receive digital content data from the electronic device 41, the mobile device 31 may be moved until a bump occurs, and then "pulled back" from the electronic device (a "bump-pull back" sequence), as shown in FIG. 11. Here, the pull back occurs at time $t_2$, and is indicated by acceleration of a greater magnitude (i.e., a greater slope on the acceleration graph) than the acceleration preceding the bump. That is, the magnitude of the movement or acceleration may be used to signify which digital (data content) transfer operation (and, therefore, direction) is to be used. Another example sequence that may be used to indicate that digital content data is to be received or transferred from the electronic device 41 to the mobile device 31 is a "bump-bump-stop" sequence. Note that when implementing the "bump-bump-stop" mode, the motion detection for device 31 may be resulting from the motion, by monitoring a microphone or other transducer coupled to device 31 thereby eliminating the necessity of accelerometer determined motion.

Figure 12:
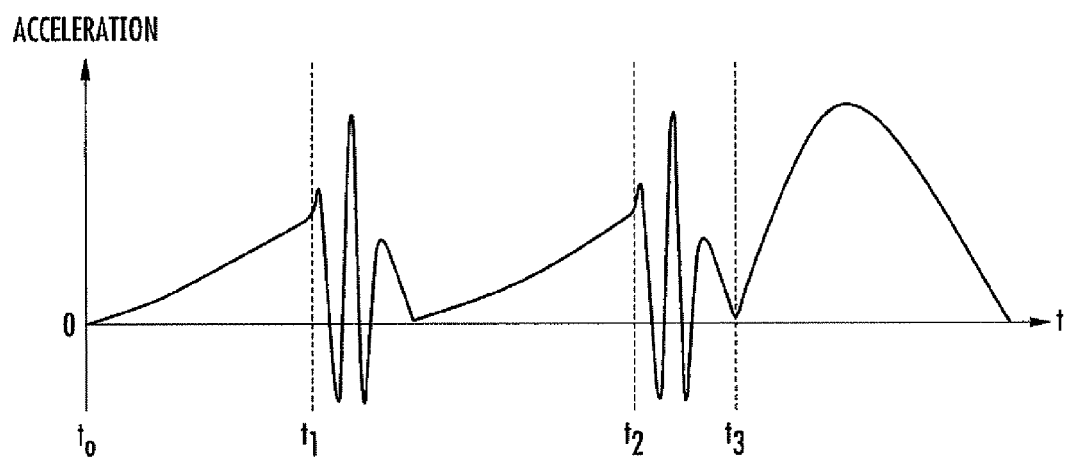

An example sequence which may be used to indicate an exchange of digital content data between the mobile device 31 and the electronic device 41 is shown in FIG. 12. In particular, this is a "bump-bump-pull back" sequence. It will be appreciated, however, that the foregoing sequences are merely provided by way of example, and that the various sequences could be assigned to different operations in different embodiments, or that other similar sequences may also be used.

Example components of a mobile wireless communications device 1000 that may be used in accordance with the above-described embodiments are further described below with reference to FIG. 13. The device 1000 illustratively includes a housing 1200, a keypad or keyboard 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 13:
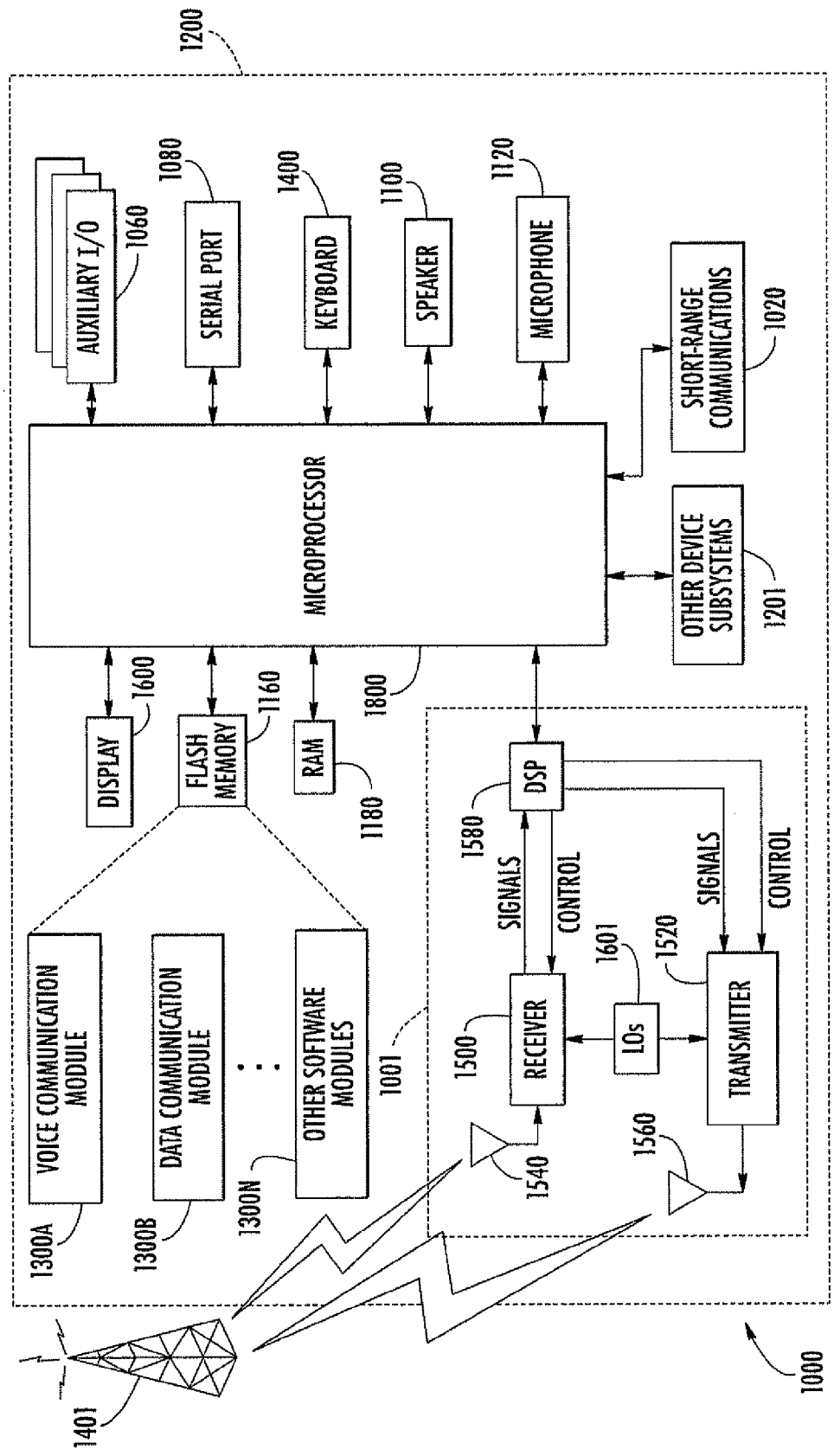
FIG. 13 is a schematic block diagram illustrating example components that may be used with the mobile wireless communications devices of FIGS. 1-2 and 7-10.

In addition to the processing device 1800, other parts of the mobile device 1000 are shown schematically in FIG. 13. These include a communications subsystem 1001; a short-range communications subsystem 1020; the keypad 1400 and the display 1600, along with other input/output devices 1060, 1080, 1100, 1120 and 1900; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem 1020 may include an infrared device and associated circuits and components, or a Bluetooth™ or NFC communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communication system comprising:
at least one electronic device configured to wirelessly communicate via a short-range communications format and to determine respective movement thereof; and
at least one mobile communications device comprising
a short-range communications device configured to wirelessly communicate with said at least one electronic device via the short-range communications format, and
a controller coupled to said short-range communications device, the controller being configured to
determine a state of movement of said at least one mobile communications device and said at least one electronic device and whether said at least one mobile communications device and said at least one electronic device moved toward one another prior to physical contact therebetween, and determine whether to transmit data to said at least one electronic device, receive data from said at least one electronic device, or both transmit data to and receive data from said at least one electronic device, based upon the respective determined state of movement of said mobile communications device and said at least one electronic device and whether said at least one mobile communications device and said at least one electronic device moved toward one another prior to the physical contact therebetween.

2. The communication system of claim 1 wherein said at least one mobile communications device further comprises a movement detection sensor coupled to said controller; and wherein said controller is further configured to determine the state of movement of said at least one mobile communications device based upon said movement detection sensor.

3. The communication system of claim 2 wherein said movement detection sensor comprises at least one of an accelerometer, an optical sensor, a gyroscope or a compass.

4. The communication system of claim 1 wherein said controller is configured to transmit digital content data to said at least one electronic device based upon determined movement of said at least one mobile communications device.

5. The communication system of claim 1 wherein said controller is configured to receive digital content data from said at least one electronic device based upon substantially no movement of said at least one mobile communications device.

6. The communication system of claim 1 wherein said controller is configured to receive digital content data from said at least one electronic device based upon being moved away therefrom.

7. The communication system of claim 1 wherein said at least one mobile communications device further comprises a housing carrying said short-range communications device and said controller; and wherein said controller is further configured to determine an impact to said housing, and determine the state of movement based upon the determined impact to said housing.

8. The communication system of claim 1 wherein said controller is configured to determine a magnitude of movement of said at least one mobile communications device, and determine the state of movement based upon the determined magnitude of movement.

9. The communication system of claim 1 wherein said short-range communications device comprises a Near-Field Communication (NFC) device.

10. The communication system of claim 1 wherein said at least one mobile communications device further comprises a wireless transceiver carried by a housing, the wireless transceiver being configured to communicate via a wireless communications network.

11. A mobile communications device comprising:
a short-range communications device being configured to wirelessly communicate with at least one electronic device via a short-range communications format, the at least one electronic device being configured to determine respective movement thereof; and
a controller coupled to said short-range communications device the controller being configured to
determine a state of movement of the mobile communications device and the at least one electronic device and whether said mobile communications device and said at least one electronic device moved toward one another prior to physical contact therebetween, and
determine whether to transmit data to said at least one electronic device, receive data from the at least one electronic device, or both transmit data to and receive data from said at least one electronic device, based upon the respective determined state of movement of said mobile communications device and said at least one electronic device and whether said mobile communications device and said at least one electronic device moved toward one another prior to the physical contact therebetween.

12. The mobile communications device of claim 11 further comprising a movement detection sensor coupled to said controller; and wherein said controller is further configured to determine the state of movement of the mobile communications device based upon said movement detection sensor.

13. The mobile communications device of claim 11 wherein said controller is configured to transmit digital content data to said at least one electronic device based upon determined movement of the mobile communications device, and to receive digital content data from said at least one electronic device based upon substantially no movement of said at least one mobile communications device.

14. The mobile communications device of claim 11 further comprising a housing carrying said short-range communications device and said controller; and wherein said controller is further configured to determine an impact to said housing, and determine the state of movement based upon the determined impact to said portable housing.

15. The mobile communications device of claim 11 wherein said controller is configured to determine a magnitude of movement of said at least one mobile communications device, and determine the state of movement based upon the determined magnitude of movement.

16. The mobile communications device of claim 11 wherein said short-range communications device comprises a Near-Field Communication (NFC) circuit.

17. A communication method for a mobile communications device configured to wirelessly communicate via a short-range communications format with at least one electronic device, the at least one electronic device being configured to determine respective movement thereof, the method comprising:
determining a state of movement of the at least one mobile communications device and the at least one electronic device and whether the mobile communications device and the at least one electronic device moved toward one another prior to physical contact therebetween; and
determining whether to transmit data to the at least one electronic device, receive data from the at least one electronic device, or both transmit data to and receive data from said at least one electronic device, based upon the respective determined state of movement of said mobile communications device and said at least one electronic device and whether the mobile communications device and the at least one electronic device moved toward one another prior to the physical contact therebetween.

18. The communication method of claim 17 wherein the at least one mobile communications device further comprises a movement detection sensor coupled to a controller; and wherein determining the state of movement comprises determining the state of movement of the mobile communications device based upon the movement detection sensor.

19. The communication method of claim 17 further comprising transmitting digital content data from the at least one mobile communications device to the electronic device based upon determined movement of the at least one mobile communications device, and receiving digital content data at the at least one mobile communications device from the electronic device based upon substantially no movement of the at least one mobile communications device.

20. A non-transitory computer-readable medium for a mobile communications device comprising a short-range communications device carried by a housing and configured to wirelessly communicate with at least one electronic device via a short-range communications format, the at least one electronic device being configured to determine respective movement thereof, and the computer-readable medium having computer executable instructions for causing the mobile communications device to perform steps comprising:
- determining a state of movement of the mobile communications device and the at least one electronic device and whether the mobile communications device and the at least one electronic device moved toward one another prior to physical contact therebetween; and
- determining whether to transmit data to said at least one electronic device, receive data from the at least one electronic device, or both transmit data to and receive data from said at least one electronic device, based upon the respective determined state of movement of said mobile communications device and said at least one electronic device and whether the mobile communications device and the at least one electronic device moved toward one another prior to the physical contact therebetween.

21. The non-transitory computer-readable medium of claim 20 wherein the mobile communications device further comprises a movement detection sensor; and wherein determining the state of movement further comprises determining the state of movement of the mobile communications device based upon the movement detection sensor.

22. The non-transitory computer-readable medium of claim 20 further having computer-executable instructions for causing the mobile communications device to perform steps comprising:
- transmitting digital content data to the at least one electronic device based upon determined movement of the mobile communications device; and
- receiving digital content data from the at least one electronic device based upon substantially no movement of the at least one mobile communications device.

* * * * *